United States Patent [19]

DeWoolfson et al.

[11] Patent Number: 4,573,641

[45] Date of Patent: Mar. 4, 1986

[54] GLASS BOTTLE COLLECTION AND CRUSHING APPARATUS

[75] Inventors: Bruce H. DeWoolfson, Vienna, Va.; Stanley Flowers, W. Milton; Robert F. Freund, Centerville, both of Ohio

[73] Assignee: Environmental Products Corporation

[21] Appl. No.: 552,777

[22] Filed: Nov. 17, 1983

[51] Int. Cl.$^4$ .......................................... B02C 25/00
[52] U.S. Cl. ...................... 241/36; 194/205; 241/99; 241/100
[58] Field of Search .................. 241/99, 101.2, 101.5, 241/36, 100, 24, 30; 194/1 E, 1 R, 4 C; 250/223 B; 209/524, 529, 583, 546

[56] References Cited

U.S. PATENT DOCUMENTS

| | | | |
|---|---|---|---|
| 2,800,159 | 7/1957 | Walsh et al. | 241/99 X |
| 3,257,897 | 6/1966 | Schneider | 88/14 |
| 3,358,552 | 12/1967 | Schneider | 88/14 |
| 3,840,857 | 10/1974 | Knight et al. | 340/146.3 F |
| 3,955,179 | 5/1976 | Planke | 340/146.3 H |
| 3,991,883 | 11/1976 | Hobler et al. | 209/73 |
| 4,055,834 | 10/1977 | Planke | 340/146.3 F |
| 4,248,389 | 2/1981 | Thompson et al. | 241/101.5 |
| 4,253,573 | 3/1981 | Dubberly et al. | 209/525 |
| 4,276,467 | 6/1981 | Dubberly et al. | 235/92 PK |
| 4,285,426 | 8/1981 | Cahill | 241/99 X |

Primary Examiner—Mark Rosenbaum
Attorney, Agent, or Firm—Finnegan, Henderson, Farabow, Garrett & Dunner

[57] ABSTRACT

Apparatus for the collection and storage of empty glass bottles, and for dispensing refund payments therefor, including a laser scanner and microprocessor preselection mechanism for determining whether a bottle offered by a customer in the bottle access area of the apparatus is an acceptable refundable bottle; two panels together forming a V-shaped base portion of the bottle access area for accepting the accepted refundable bottle; a solenoid and latch mechanism for tilting one of the two panels inwardly toward a crushing area in response to a determination by the preselection mechanism of the color of the accepted refundable bottle to sort the bottles by color; one or more crushing wheels positioned beneath each panel for receiving the acceptable refundable bottles deposited by gravity from the inwardly tilted panel, the crushing wheels having a plurality of extending bars capable of smashing the accepted refundable bottle into glass cullet; a collection hopper positioned beneath the crushing wheels located under each panel for storing the glass cullet; and a coin dispensing means for dispensing payment for the bottles accepted.

4 Claims, 10 Drawing Figures

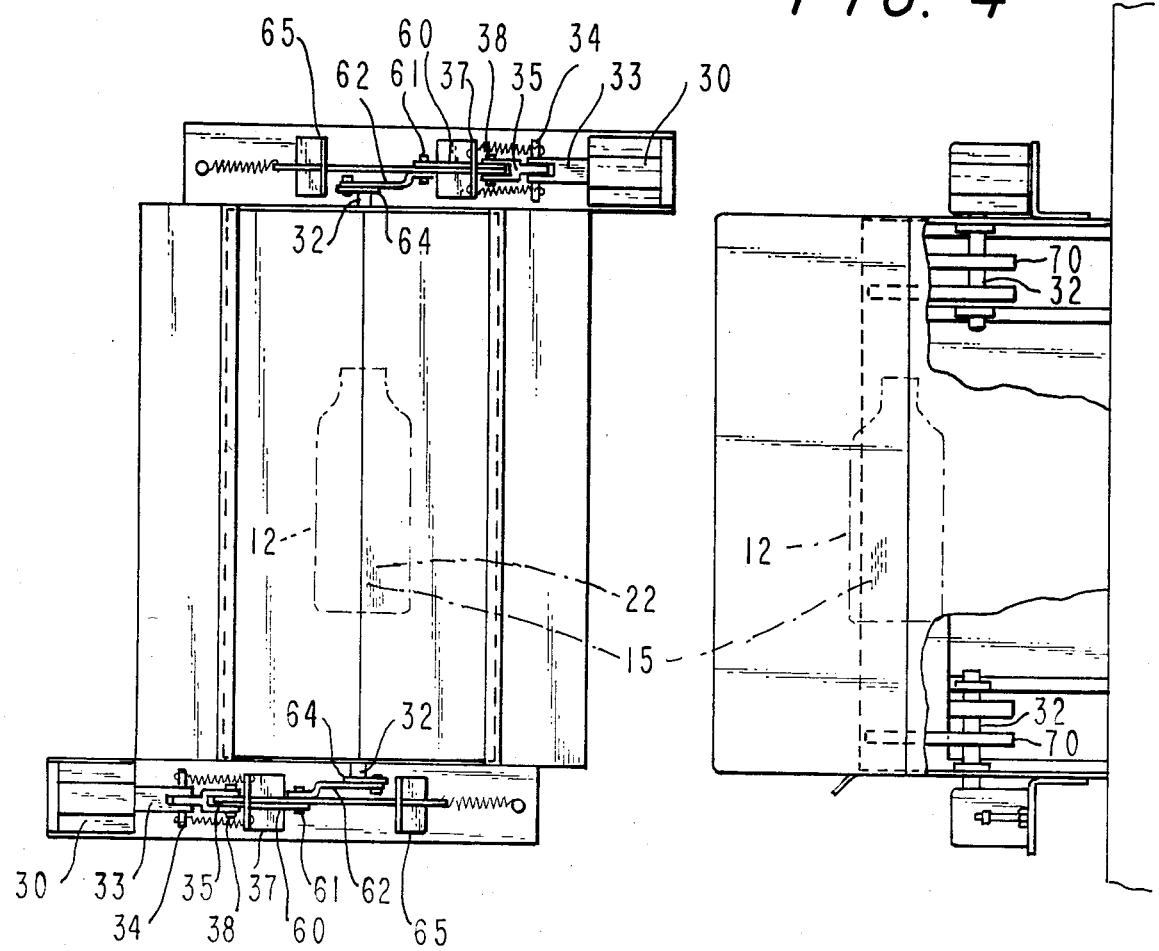
FIG. 3
FIG. 4
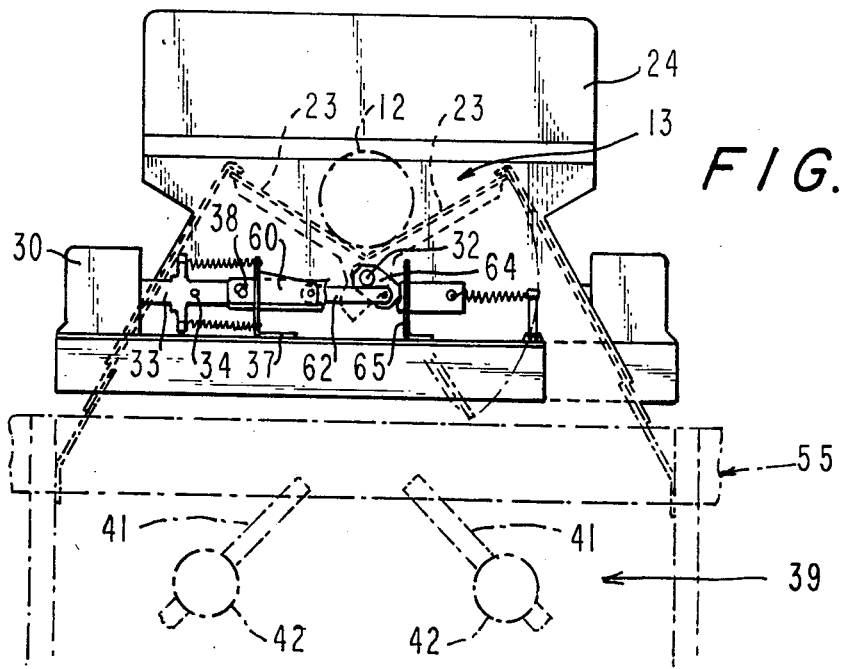
FIG. 5

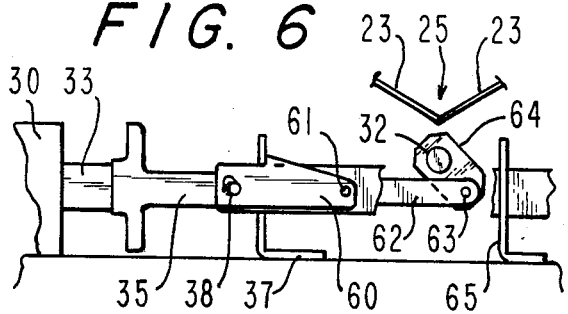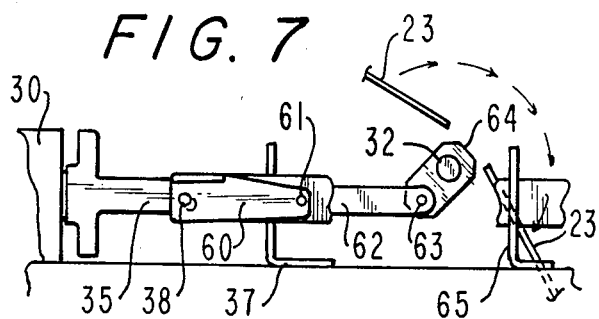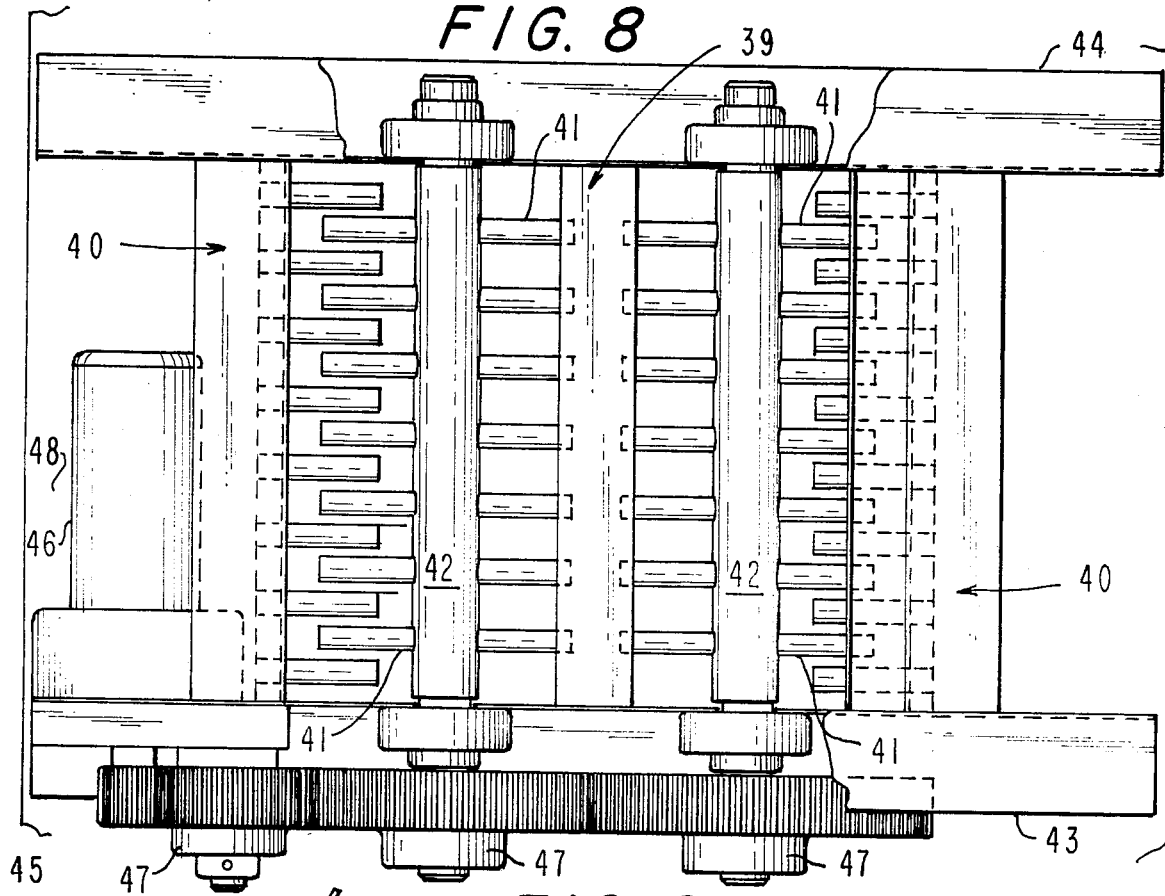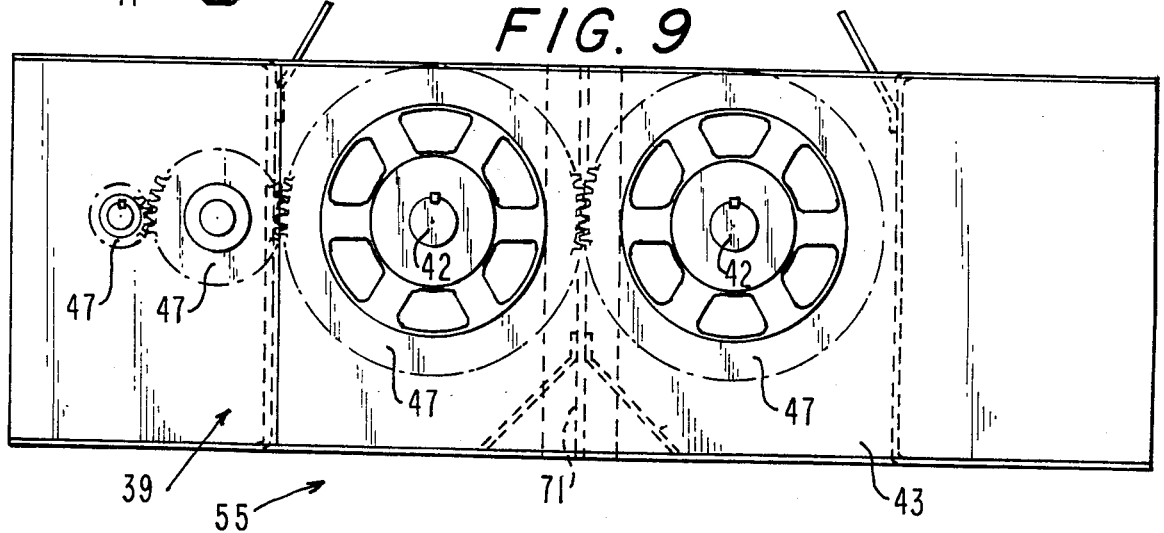

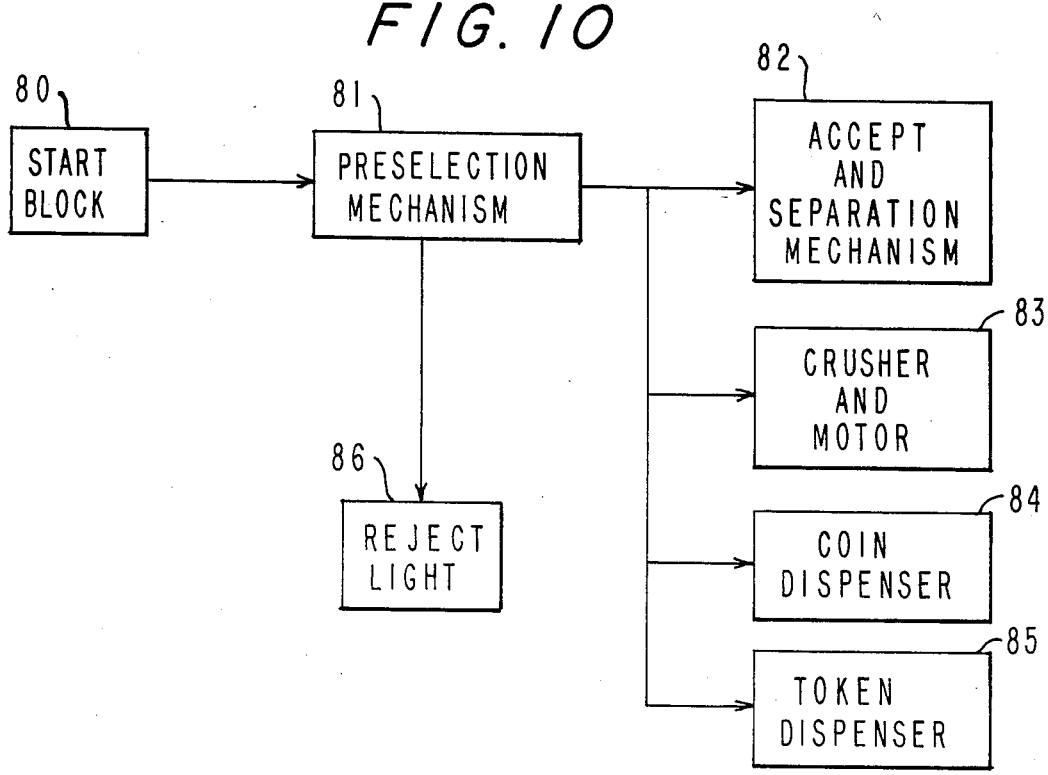

GLASS BOTTLE COLLECTION AND CRUSHING APPARATUS

BACKGROUND OF THE INVENTION

This invention relates to apparatus for collecting and storing glass bottle containers and, more particularly, machines for collecting, crushing, and storing crushed glass bottles in recycling, and for dispensing coins or tokens in exchange for the bottles so collected.

With increasing emphasis in recent years on energy conservation and environmental preservation, the collection and recycling of empty glass bottles has become an important factor in the conservation and preservation effort. The recycling of glass bottles has helped to reduce the presence of broken glass bottles strewn throughout the environment and lessen energy consumption by recycling empty glass bottles for future use. Numerous states and localities have adopted glass conservation programs that require the recycling of glass bottles.

Unfortunately, the lack of an efficient and economical system to recover and reuse glass bottles has largely caused a tremendous waste of recoverable bottles, since currently it is often easier and more economical, in the short term, to discard the bottles, instead of recycling them. Additionally, the recycling of bottles poses numerous problems in ascertaining whether a particular bottle is refundable; sorting refundable bottles by brand and color; and determining the value of the refund to be given by the store to the customer. Often, stores must either hire extra employees for these particular time consuming tasks or allow customers to return the bottles on an honor system, in which the customer is trusted to report the correct amount of the bottles he has returned.

Some machines have been developed for encouraging the recovery and recycling of glass bottle containers. For example, U.S. Pat. No. 4,248,389 to Thompson et al discloses an apparatus for sorting and handling diverse types of containers by using an optical scanner to read a code on the container. However, this machine does not preselect the containers prior to acceptance by the machine to distinguish between acceptable and unacceptable containers. Similarly, it does not sort the bottles by the color of the glass. Consequently, a customer who inserts a non-refundable bottle into the apparatus must wait while the machine conveys the bottle to the optical reader, which determines the identity of the bottle. The resulting crushed glass from the break up of the accepted bottles is a mixture of colors due to the lack of color separation by the machine of the diverse bottle colors. Accordingly, the crushed glass must either be painstakingly separated by color prior to use, or melted down as a color mixture, which mixture may have less economic value per unit weight than color separated glass.

Likewise, the apparatus shown in U.S. Pat. Nos. 4,253,573 and 4,276,467 to Dubberly et al. receives and handles empty beverage containers for refund purposes, but the apparatus does not either sort the bottles by color or break up the bottles to save storage space. Finally, U.S. Pat. No. 3,955,179 to Planke shows an apparatus for the automatic pattern recognition and registration of empty bottles; however, the apparatus neither sorts the bottles by color nor crushes the bottles.

SHORT STATEMENT OF THE INVENTION

The present invention obviates the disadvantages associated with these types of bottle collection devices by providing a reverse vending machine for the unit recovery of empty glass bottles. The apparatus of the present invention is quick and convenient to use, and it will save substantial time and expense on the part of the retailer in providing refunds for refundable bottles to the customer. Due to this increased ease in usage and decrease in operational cost, the present invention allows for the attainment of environmental and energy conservation goals in an efficient and economical manner.

The present invention preselects only those bottles that are refundable prior to accepting the offered bottle into the machine. Unacceptable and nonrefundable bottles are recognized by the apparatus and not processed further. Once accepted, the refundable bottle is separated by color and crushed for easy storage. The present invention eliminates the need of having a store or retailer use employees to identify and sort the refundable bottles, and give refunds to the customers. Rather, the present invention automates these previously manually performed tasks so that the customer, unaided, can return and receive a refund for his bottles.

Additionally, the present apparatus retains a count of the different kinds of bottles that it has received and, therefore, it can provide a detailed description of the types or brands of bottles returned to the store. The refunded bottles are separated by color, crushed, and stored by the present apparatus to make it easy for the glass of the bottles to be recovered for recycling. By crushing the returned bottles, the present invention lessens the space requirements that the store must allocate for handling the returned bottles and, thereby, allows the store to use this valuable space for other more economical uses.

To achieve the foregoing advantages, the apparatus of this invention for collecting and storing refundable empty glass bottles of two or more individual colors and for issuing predetermined return deposits for the containers collected, each refundable bottle having a code imprinted thereon, comprises preselection means for determining the brand, color and refundability of a preferred empty glass bottle, the preselection means including a laser scanner for reading the imprinted code on each glass bottle, a bottle access area configured to accommodate bottles for exposure to the laser scanner, and a microprocessor capable of receiving and interpreting the read code from the laser scanner, means for accepting only a bottle identified by the preselection means as being refundable, the accepting means sorting the refundable bottles into either of two colors, means responsive to the accepting means for crushing the refundable bottles into glass cullet, the crushing means including one or more rotating crushing wheels, coin or token dispensing means responsive to the preselection means for dispensing coins in return for the refundable bottles, and means for storing the glass cullet received from the crushing means.

Preferably, the accepting means includes two panels which together form a V-shaped base portion of the bottle access area. The accepting means further includes opening means, such as a solenoid and latch mechanisms, associated with each panel for tilting the associated panel inwardly towards the crushing means to allow a bottle, placed on the base portion to fall, inwardly to the crushing means. Depending upon the color of the bottle, the preselection means activates the proper one of the solenoid and latch mechanisms to cause the attached panel to tilt inwardly, thereby allowing the bottle to fall by gravity into the crushing means.

In this embodiment, the crushing means includes one or more rotating crushing wheels positioned beneath each panel to receive the refundable bottles deposited by the accepting means and to crush the received bottles into glass cullet. Preferably, each crushing wheel includes a cross bar, which has its opposite ends attached to the front and back walls of the crushing wheel housing, and a plurality of bars outwardly extending from the cross bar. The crushing wheels are rotated by a drive mechanism which is actuated by the preselection means. The storage means can include a collection hopper positioned beneath the crushing wheels so that the crushed glass falls by gravity into the hoppers.

The present invention also provides a method for collecting and storing refundable empty glass bottles and issuing predetermined return deposits for the containers collected, comprising the steps of imprinting a code on each refundable bottle identifying the brand and glass color of each bottle, exposing an empty glass bottle to a laser scanner microprocessor preselection mechanism for identifying whether the bottle is refundable, accepting only a bottle identified by the preselection mechanism as being refundable, sorting the accepted bottles into either of two colors, crushing the sorted refundable bottles into glass cullet, depositing the crushed glass cullet into two receptacles for storing the glass cullet by color, and dispensing coins or token payments for the accepted refundable bottles.

The present invention provides various further advantages. For example, the apparatus of the present invention accepts bottles having a large variety of diameters and lengths. The accepting means also provides safety to the consumer, since the consumer does not have direct access to the crushing means. The crushing means insures against the color contamination of the separated glass by using two totally separate crushing chambers.

The present invention saves on energy, since only one power source is required to provide color separation by both the accepting and crushing means. The power source can be set to work on standby power, so that the machine has a high power demand only when bottles are placed in the machine.

The present apparatus is also self-cleaning during operation of the machine, because non-glass material that enters the machine, such as a plastic jacket around a glass bottle, is cut or shredded by the crushing means to prevent the clogging of the accepting and crushing means.

BRIEF DESCRIPTION OF THE DRAWINGS

The accompanying drawings, which are incorporated in and constitute a part of the specification, illustrate one embodiment of the invention and, together with the description, serve to explain the principles of the invention.

FIG. 3 is a plan view of the bottle access area of the apparatus of FIG. 1.

FIG. 4 is a cutaway plan view of the bottle access area of FIG. 3 showing the tilting assembly connected to each panel.

FIG. 5 is a front view of the bottle access area of FIG. 3.

FIG. 6 is a side view of the solenoid and latch mechanism of the apparatus of FIG. 1 in the closed position.

FIG. 7 is a side view of the solenoid and latch mechanism of FIG. 6 in the open position.

FIG. 8 is a top plan view of the crushing wheels of the apparatus in FIG. 1.

FIG. 9 is a side view of the crushing wheels of FIG. 8.

FIG. 10 is a block functional diagram depicting one embodiment of a circuit for use in the apparatus of the present invention.

DESCRIPTION OF THE PREFERRED EMBODIMENT

Figure 1:
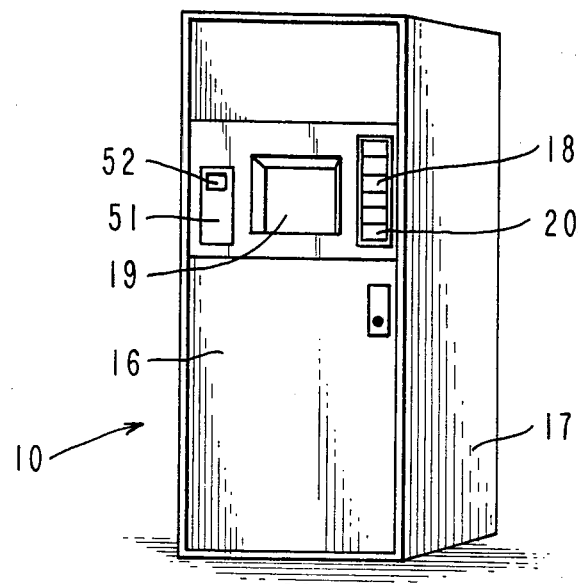
FIG. 1 is a perspective view of the apparatus of the present invention.
Figure 2:
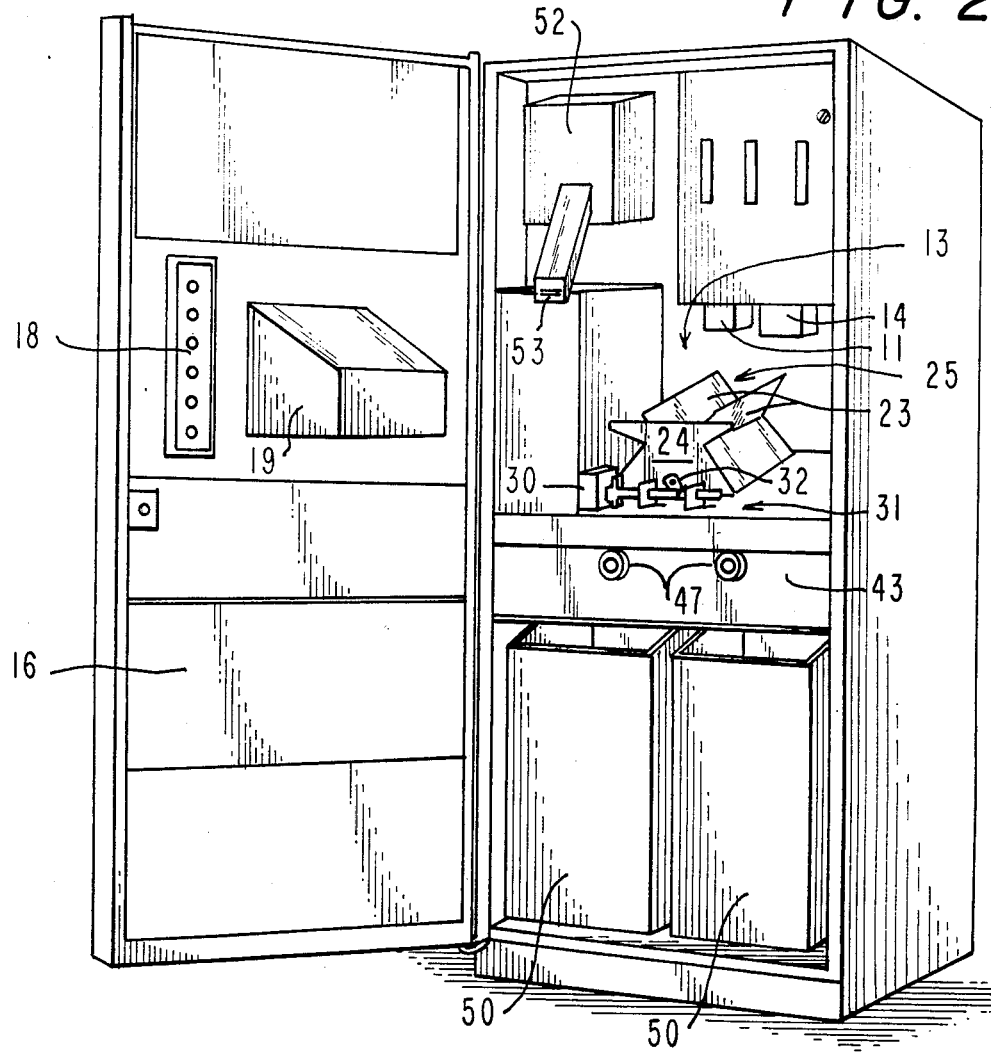
FIG. 2 is a perspective view of the apparatus of FIG. 1 with the front door open.

Reference is now made in detail to the present preferred embodiment, an example of which is illustrated. Referring now to FIGS. 1-2, it may be seen that the bottle collection and storing apparatus of the invention provides rapid and efficient means for collecting empty glass bottles for recycling and effecting direct refund of return desposits. The apparatus for collecting and storing glass bottles generally includes a cabinet housing 10, having a door 16, side panels 17, and a control panel 18 on the door 16.

In accordance with the invention, the apparatus for collecting and storing refundable empty glass bottles of diverse colors and for issuing predetermined return deposits for the bottles collected, each refundable bottle having code imprinted thereon to identify the brand and color of the bottle, includes preselection means for determining the brand, color and refundability of an empty glass bottle, the preselection means including a laser scanner for reading the imprinted code on each bottle, a bottle access area configured to accommodate the bottles for exposure to the laser scanner and a microprocessor capable of receiving and interpreting the read code from the laser scanner. As embodied herein, the preselection means includes a laser scanner 11 for identifying whether a bottles 12 placed within a bottle access area 13, by the customer, is refundable and a bottle access area 13 for accommodating glass bottles of varying sizes, typically, within the range of 10 to 32 ounces. The laser scanner 11 is preferably mounted above the bottle access area 13, but other configurations within the art are acceptable. The door 16 has an opening 19 through which the bottles can be inserted to be placed on the bottle access area 13.

As embodied herein, the preselection means further includes a microprocessor 14 positionable either within the cabinet housing 10 or apart from the cabinet housing 10 as a separate unit. The microprocessor 14 contains a programmable memory area. In operation, the laser scanner 11 reads an imprinted code 15 on each bottle 12 placed within the bottle access area 13, and transmits the read code to the microprocessor 14.

The microprocessor 14 receives the signal containing the read code from the laser scanner 11 and compares the read code with a list of codes contained within its programmable memory. The programmed codes provide information, such as refunds, price, and bottle color, about the acceptable, refundable glass bottles. If the read code matches a code on the programmed list, then the microprocessor 14 transmits a signal to the accepting means to indicate that the bottle 12 placed within the bottle access area 13 is to be received into the machine. However, if the read code fails to correspond with a code on the programmed list in the microprocessor programmable memory area, the microprocessor 14 transmits a signal to an indicator means, such as a signal light 20 on the control panel 18, to indicate to the customer that the bottle is unacceptable for refunding purposes and, accordingly, the bottle 12 should be removed from the bottle access area 13.

For example, the programmable memory of the microprocessor 14 can be programmed to include a coded list of the various brands or types of bottles that are acceptable for refunding by a particular retailer. The programmed list can be tailored to the particular retailer depending upon the bottle products that he is willing to provide a deposit refund. The programmed list can also include the deposit amount to be provided to the customer for each type or brand of bottle. The various refund amounts can be adjusted within the programmable memory area of the microprocessor 14 to allow for changes in the price structure. When the microprocessor 14 has determined that a particular bottle 12 placed within the bottle access area 13 is to be accepted for further processing, the brand or type of the accepted bottle is stored in the memory area of the microprocessor 14. This storage of the bottle brand or type information, in the microprocessor 14, allows a particular retailer to know the distribution and classification of the various bottles for which he has provided a refund.

The microprocessor 14 can also include a modem 21 so that a central computer (not shown) can collect, preferably by use of telephonic hookups, the information from the microprocessor memory compartment to provide summary information of the types and brands of bottles refunded by a number of apparatus located within a number of stores. This information collected by the central computer can be used to render accounting between beverage companies, retailers, and recycling companies.

Preferably, the code imprinted on the bottles 12 is an UPC (Uniform Product Code) bar code, since its use has become relatively widespread. The laser scanner 11 and microprocessor 14 of the apparatus, however, can be programmed to read a wide variety of other types of codes imprinted on the bottles 12. Additionally, it is preferred that each refundable bottle contain an additional marking 22 that exhibits special spectral response properties, when viewed by the laser scanner 11, to indicate that the bottle is an authentic bottle for which a refund is to be provided. This marking 22 can be used to decrease the likelihood of giving refunds for unacceptable or counterfeit bottles. Similarly, this marking 22 can be used to indicate bottles from different localities to differentiate between bottles from localities that require the recycling of bottles and bottles from localities that do not require such recycling. The laser scanner 11 reads the marking 22, and transmits a signal to the microprocessor 14 in the same manner as it reads and transmits the imprinted code 15 on the bottle 12. Alternatively, the marking 22 can be included within the imprinted code 15 to provide, on a particular bottle 12, only one code location that must be read by the laser scanner 11.

Sensing means can be positioned within or near the bottle access area 13 to sense the bottle 12 placed within the bottle access area 13 to ensure that a glass bottle 12, and not another type of container such as an aluminum can, is present within the bottle access area 13. As herein embodied, such sensing means include mechanisms known in the art to detect the bottle profile; to measure the light reflective properties of the bottle; to determine the sound reflective properties to the bottle; and to sense mechanically the bottle by mechanical finger switches.

The accepting means accepts for further processing only those bottles identified by the preselection means as being refundable. As herein embodied, the accepting means includes two panels 23 that together form a V-shaped base portion 25, which supports the bottle 12 in the bottle access area 13. As shown in FIGS. 3-5, in a placement position, the panels 23 are angled with respect to each other to form the V-shaped base 25. The customer or retailer places the empty glass bottle 12 on the V-shaped base 23, wherein the laser scanner 11 reads the imprinted code 15 and any other markings 22 on the bottle 12. End pieces 24 are positioned at the outer ends 25 of the bottle access area 13 to provide an enclosure for the bottles 12 placed within the bottle access area. Preferably, the panels 23 and end pieces 24 are made from stainless steel or aluminum sheets.

The accepting means further includes opening means attached to each panel responsive to the preselection means to sort the refundable bottles into two colors by selectively opening one of the two panels 23 depending upon the color of the refundable bottle, which has been deposited in the bottle access area 13. Preferably, the opening means includes a solenoid 30 and a latch mechanism 31 adjacent to each end piece 24. Each solenoid 30 and latch mechanism 31 is connected to one of the panels 23 forming the V-shaped base portion 25 by a pivot bar 32. If a refundable bottle is placed in the bottle access area 13, the microprocessor 14 transmits a signal to one of the two solenoid 30 and latch mechanisms 31. The particular solenoid 30 and latch mechanism 31 that receive the signal depends upon the bottle's color.

The activated solenoid 30 and latch mechanism 31 turns the pivot bar 32 to cause the connected panel 23 to tilt inwardly towards the crushing area 39 to deposit the bottle, previously resting upon the base portion 25, by gravity into the crushing means. As noted, the particular solenoid 30 and latch mechanism 31, activated by the microprocessor 14, depend upon the bottle color determination made by the microprocessor 14 when the microprocessor 14 matches the read code from the laser scanner 11 with the stored codes in its programmable memory area. The particular stored codes in the microprocessor 14 will indicate the color of a particular brand or type of bottle.

A detailed view of the preferred solenoid 30 and latch mechanism 31 is shown in FIGS. 3, 6, and 7. Each solenoid 30 has a U-shaped clamp 33 with a dowel pin 34 inserted through the legs of the U portion. A Y-shaped clamp 35 has an arm positioned within the legs of the U-shaped clamp 33 and held in position by the dowel pin 34. A spring 36 is connected between the dowel pin 34 and an L-bracket 37. A dowel pin 38 holds a latch piece 60 in place between the legs of the Y-shaped clamp 35. The latch piece 60 is connected by a dowel pin 61 to latch piece 62, which in turn is joined by a dowel pin 63 to a swing piece 64. The swing piece 64 is connected to the pivot bar 32.

As shown in FIG. 6, in the closed position, the swing piece 64 is tilted at an angle toward the solenoid 30, to which it is attached by the latch mechanism 31. The panel 23 cannot be forced open by placing pressure on the panel 23, since the swing piece 64 is locked in position by the latch piece 62, which holds the swing piece 64 firmly in position against an L-bracket 65. As shown in FIG. 7, in the open position, the panel 23 is tilted inwardly by the swing piece 64 rolling the pivot bar 32. In the open position, the swing piece 64 is activated by the latch piece 62 being moved toward latch piece 60 as a result of the pull on clamps 33 and 35 and spring 36, by the activation of the solenoid 30.

Means responsive to the accepting means for crushing the refundable bottles into glass cullet, the crushing means including one or more rotating crushing wheels. As herein embodied, the crushing means includes one or more crushing wheels 40 located under each panel 23. Each crushing wheel 40 has a cross bar 42 and a plurality of bars 41 extending outwardly from the cross bar 42. Each cross bar 42 is rotatably mounted in a front wall 43 and back wall 44 of the crushing wheel housing 55. As the crushing wheel 40 is rotated, the extending bars 41 smash the bottles falling by gravity into the crushing area 39. A drive mechanism 45 is operationally connected to the cross bar 42 for imparting to it the necessary circular motion. A wall 71 is positioned between the crushing wheels 40 to segregate the glass, by color, as it is crushed.

The drive mechanism 45 includes an electric motor 46 that powers rotating gears 47. The motor 46 is mounted onto a supporting bracket 48 by means of bolts or other appropriate fastening means. In operation, an accepted glass bottle falls into the crushing area 39, when one of the panels 23 is tilted inwardly toward the crushing area 39. The rotating cross bar 42 and extending bars 41 of the crushing wheels 40 are driven by the drive mechanism 45 to smash the falling bottle.

The apparatus includes storage means for receiving the glass cullet from the crushing means, and for storing the glass cullet. As herein embodied, the storage means comprises a collection hopper 50 positioned in the lower portion of the housing unit beneath the crushing area 39. The collection hopper 50 can have various wheels or movement means to facilitate the removal of the hopper 50 from the apparatus.

In accordance with the invention, the apparatus also includes a coin dispensing means responsive to the preselection means for dispensing payment in return for bottles that are refundable. As herein embodied, the coin dispensing means includes an interchangeable circular coin magazine 51. The use of the interchangeable magazine 51 allows for rapid servicing of the machine, since a full coin magazine may be quickly interchanged with the empty or partially filled magazine in the machine. The coin dispensing means of the apparatus may also include suitable sensors (not shown) to indicate when the coin magazine 51 is emptied and to actuate a signal light on the front of the apparatus.

The invention may also include a token dispensing means for issuing coupons at predetermined or random intervals for the collected bottles in addition to the stated refunds. As herein embodied, the token dispensing means includes a dispenser 52 mounted within the housing 10, and electrically connected to the preselection means of the apparatus. Individual coupons are dispensed one at a time through a slot 53 in the door 16 of the housing 10. Preferably, the structure of the token dispenser 52 is conventional and accommodates rolls of coupons in the form of tickets. The token dispenser 52 may be connected to a counter (not shown) in the coin dispenser means for issuing a coupon only upon acceptance of a predetermined plurality of bottles. The token dispenser 52 acts as an additional inducement for consumers to return refundable bottles, since the coupons or tickets may be exchangeable for valuable discounts or prizes.

In the illustrated embodiment, the preselection mechanism is actuated by a current from the apparatus power supply, such as an electrical outlet (not shown). When an acceptable refundable bottle is determined to be present with the bottle access area 13, the current through the laser senser 11 is cut off by the microprocesssor 14, and the accepting and crushing means are actuated.

The sequence of operation of the apparatus of the present invention is initiated when a customer or retailer places a glass bottle 12 on the panels 23 forming the V-shaped base portion 25 in the bottle access area 13. The preselection mechanism is energized and the laser scanner 11 reads the imprinted code 15, if any, on the bottle 12 to determine if the bottle is acceptable for refunding. If the laser scanner 11 and the microprocessor 14 of the preselection means determine that the bottle 12 is not one of the bottles for which a refund is to be given, then a signal light 20 is activated by the microprocessor 14 to indicate to the customer that the bottle is not acceptable. Similarly, if the bottle 12 lacks an imprinted code 15, then the bottle is automatically rejected. Depending upon the type of laser scanning 11 being used, the bottle 12 is positioned in the bottle access area 13 to allow the laser scanner 4 to read the imprinted code 15.

If the laser sensor 11 and microprocessor 14 determine that the bottle is one for which a refund is to be given, the microprocessor 14 activates one of the two solenoids 30 and associated latch mechanisms 31. The determination of which solenoid 30 and associated latch mechanism 31 is to be activated, is made by the microprocessor 14 based upon the color of the bottle 12. The activated solenoid 30 and its associated latch mechanism 31 rotates the pivot bar 32 so as to cause the desired connected panel 23 to tilt inwardly towards the crushing area 39. By tilting the panel 23 inwardly towards the crushing area 39, the solenoid 30 and associated latch mechanism 31 causes the bottle positioned on the base portion 25 of the bottle access area 13 to fall by gravity into the crushing area 39.

As shown in FIG. 4, the pivot bar 32 is connected by panel support pieces 70 to each panel 23. When the swing piece 64 is activated by the solenoid 30, the pivot bar rotates the connected panel 23 inwardly toward the crushing area 39 by rotating the panel support pieces 70.

When it is determined by the preselection mechanism that a refundable bottle is in the bottle access area 13, the microprocessor 14 activates the electric motor 46 and gears 47 of the drive mechanism 45 to cause the rotation of the cross bar 42 and extending bars 41 of the crushing wheels 40. As the bottle 12 is dropped by the inwardly tilting panel 23 into the crushing area 39, the rotating crushing wheels 40 smash the glass bottles into glass cullet. The smashed glass cullet falls by gravity into the collection hopper 50 positioned under the crushing wheels 40.

The coin dispensing mechanism is also activated in response to an indication from the preselection means of the presence of a refundable bottle. The coin dispenser ejects appropriate coins to the customer. After ejection of the coins and the operation of the crushing mechanism to smash the glass bottle into glass cullet, the apparatus shuts down and is ready for the placement of another bottle in the bottle access area 13.

The apparatus is designed to operate on a standard power supply. The present invention is preferably contained within an upright housing 10, which is visibly comparable in size to a soft drink dispensing machine. The apparatus may also contain self-diagnostic means to indicate the need of servicing the apparatus.

The block functional diagram in FIG. 10 depicts one embodiment of a circuit for use in the apparatus in this invention. The sequence is initiated by the start block 80, which corresponds to the placement of a bottle 12 in the bottle access area 13 and the activation of an appropriate switch means on the apparatus. The start of the machine energizes the preselection mechanism 81, which determines whether the bottle 12 is acceptable for refunding. If the preselection mechanism 81 indicates that the bottle is acceptable for refunding, the accept and separation means 82, the crusher and motor 83, the coin dispenser 84 and, optionally the token dispenser 85 are all activated. If the preselection mechanism 81 determines that the bottle is unacceptable for a refund, then the reject light 86 is activated.

In addition to the apparatus described in detail above, the invention also comprises a method of collecting and storing refundable empty glass bottles and issuing predetermined return deposits for the containers collected. The method of the present invention comprises the steps of imprinting a code on each refundable bottle identifying the brand and glass color of each bottle, and exposing an empty glass bottle to a laser scanner and microprocessor preselection mechanism for identifying whether the bottle is refundable. The method of the present invention further includes accepting only bottles identified by the preselection mechanism as being refundable, and sorting the refundable bottles into two or more colors. The method further includes crushing the sorted refundable bottles into glass cullet, depositing the crushed glass cullet into two or more receptacles for storing the glass cullet by color, and dispensing coin payments for the accepted refundable bottles. The method may be accomplished through the use of the apparatus described above, or through any other suitable apparatus which utilizes the disclosed steps.

It will be apparent to those skilled in the art that various other modifications and variations could be made in the structure of the invention without parting from the scope and content of the invention.

What is claimed is:

1. Apparatus for collecting and storing refundable empty glass bottles of two or more individual colors and for issuing predetermined return deposits for the bottles collected, each refundable bottle having a code imprinted thereon to identify the brand and color of the bottle, comprising:
    (a) preselection means for determining the brand, color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner;
    (b) means for accepting only a bottle identified by the preselection means as being refundable, the accepting means sorting the refundable bottles into two colors, the accepting means including two panels together forming a V-shaped base portion of the bottle access area, each panel being independently tiltable inwardly toward the crushing means, and an opening means attached to each panel responsive to the preselection means to sort refundable bottles into colors by selectively tilting one of the two panels of the V-shaped base portion depending upon the color of the refundable bottle to deposit the bottle by gravity into the crushing means;
    (c) means responsive to the accepting means for crushing the refundable bottles into glass cullet, the crushing means including at least one rotating crushing wheel;
    (d) dispensing means responsive to the preselection means for dispensing at least one of a coin and a token in return for the refundable bottles; and
    (e) means for storing the glass cullet received from the crushing means.

2. The apparatus as in claim 1 wherein at least one rotating crushing wheel is positioned beneath each panel of the V-shaped base portion to receive the refundable bottles deposited by the accepting means and to crush the received bottles into glass cullet.

3. The apparatus as in claim 2 wherein the storing means includes a collection hopper positioned beneath the at least one crushing wheel located under each panel of the V-shaped base portion.

4. The apparatus as in claim 3 wherein the collection hopper is removable and portable.

* * * * *